United States Patent Office 2,982,651
Patented May 2, 1961

2,982,651

ANTI-STATIC PHOTOGRAPHIC FILM

E Scudder Mackey, Binghamton, N.Y., assignor to General Aniline & Film Corporation, New York, N.Y., a corporation of Delaware No Drawing. Filed Feb. 26, 1958, Ser. No. 717,575

20 Claims. (Cl. 96—87)

This invention relates to photographic film and more particularly to photographic film having improved anti-static coatings.

A great amount of trouble is caused during the manufacture or use of photographic film which is due to the accumulation of the electrical charges of the film. These electrical charges, which are known as static, may be caused by friction of the film against the rollers or other parts of the machines through which it passes, by contact with dissimilar surfaces or by numerous other causes all too well-known to those experienced in the manufacture of photographic film. Static discharges produced in film prior to development manifest themselves after processing by the formation of irregular streaks or lines caused by lightning-like exposure of the emulsion at such portions. Static charges are also objectionable in finished film, particularly motion picture film, and cause an increase in the friction as the film passes through the gates or past other parts of the projector mechanism.

Previous attempts to overcome static in photographic films have, for the most part, followed the lines of applying conducting or hygroscopic materials to the surface of the film in order to increase its electrical conductivity. Many of the substances are incompatible with the materials which form one or more layers of the photographic film and introduce new manufacturing difficulties.

I have found that this static susceptibility can be minimized by adding to one of those layers of the photographic film which are prepared from a water permeable colloid, an anti-static amount of an imidazolinium salt which is substituted on the pentavalent nitrogen atom by (1) a hydroxy group; (2) a hydroxyalkyl or carboxyalkyloxyalkyl group and (3) an alkylcarboxy group and which are substituted on the carbon atom situated between the two nitrogen atoms by a long-chain alkyl group.

Films provided with such anti-static layers constitute the purposes and objects of my invention.

The imidazolinium salts used in accordance with my invention are characterized by the following formulae:

(A)

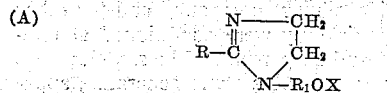

and (B)

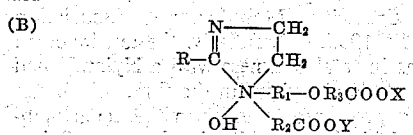

In these formulae, R represents an aliphatic hydrocarbon chain of from 7 to 21 carbon atoms; $R_1$ and $R_2$ are aliphatic hydrocarbon radicals of from 1 to 4 carbon atoms; X represents hydrogen or an alkali metal atom and Y represents an alkali metal atom.

Compounds defined by the formula A are prepared according to the procedures described in United States Patent 2,528,378 by reacting one mole of a monocarboxylic aliphatic acid having at least 8 carbon atoms with one mole equivalent of aminoethylethanolamine until 2 moles of water have been removed and the imidazoline has been formed by ring closure. The quaternary hydroxy imidazolinium derivative is then produced by reacting the substituted imidazoline with a monohalomonocarboxylic acid in an aqueous alkali solution.

Compounds characterized by the formula B are prepared according to the process described in United States Patent 2,773,068 and involves the reaction of one mole of alkylhydroxy substituted imidazoline with 2 moles of a monohalogen substituted monocarboxylic acid in aqueous alkaline solution having a pH of about 13.

Compounds which I have found particularly suitable include the following imidazolinium derivatives:

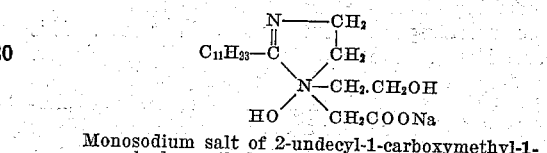

Monosodium salt of 2-undecyl-1-carboxymethyl-1-hydroxyethyl-imidazolinium hydroxide

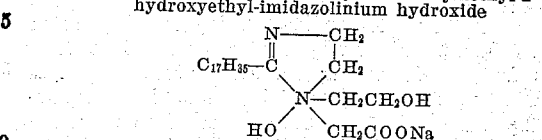

Monosodium salt of 2-heptadecyl-1-carboxymethyl-1-hydroxyethyl-imidazolinium hydroxide

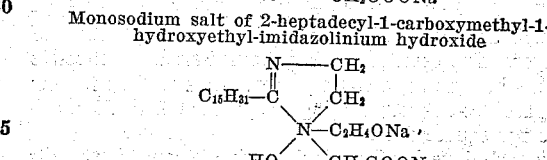

Disodium salt of 2-pentadecyl-1-carboxymethyl-1-hydroxyethyl-imidazolinium hydroxide

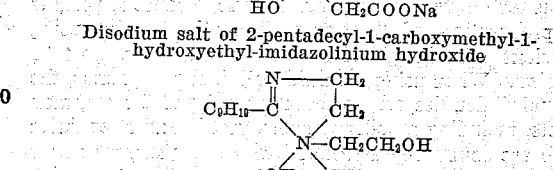

Monosodium salts of 2-nonyl-1-carboxymethyl-1-hydroxyethyl-imidazolinium hydroxide

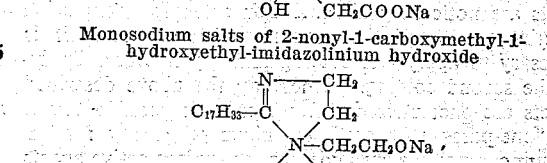

Disodium salt of 2-heptadecenyl-1-carboxymethyl-1-hydroxyethyl-imidazolinium hydroxide

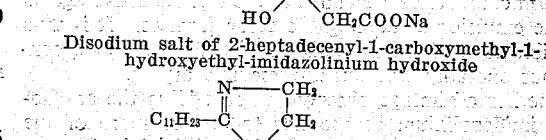

Disodium salt of 2-undecyl-1-carboxymethyl-1-(β-carboxymethyl-oxethyl)-imidazolinium hydroxide

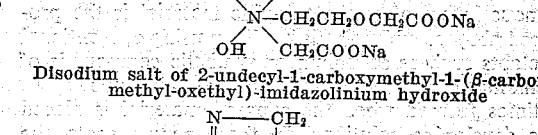

Disodium salt of 2-nonyl-1-(β-carboxyethyl)-1-(β-carboxyethyl-oxyethyl) imidazolinium hydroxide

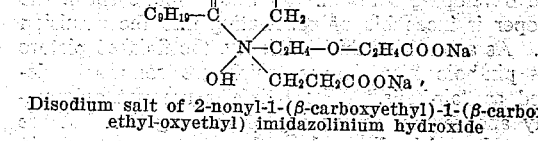

Disodium salt of 2-tridecyl-1-carboxymethyl-1-carboxymethyl-oxyethyl-imidazolinium hydroxide

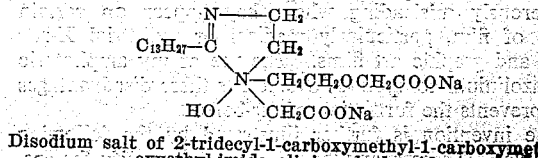
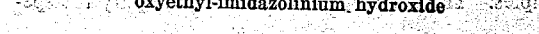

These amphoteric compounds apparently have the ability to become molecularly oriented in such a way so as to provide anti-static protection.

The amphoteric compounds may be added to the emulsion layers, antihalation layers, non-curling layers which are also known as N.C. layers or to surface layers which are used to overcoat the emulsion. They can be used alone or in combination with saponin or with other well-known surface active agents such as those described in United States Patent 2,186,717.

In addition to the anti-static properties, I have found that the amphoteric imidazolinium derivatives have other valuable properties for the coating of photographic layers onto a suitable support such as film base or paper base. The addition of these materials to photographic emulsions or gelatin coating compositions generally permits smooth, even coatings without streaking. The use of the imidazolinium compounds in emulsions or other gelatinous layers permits them to be overcoated in chilled or set, but undried, condition with another gelatin coating containing either the amphoteric material or other well-known coating agents such as saponin or both. This procedure is referred to as a "wet-on-wet" coating process.

The amphoteric imidazolinium compounds used in accordance with my invention are added to the liquid photographic emulsion or other aqueous colloidal dispersions such as gelatin solution in proportion of 0.1 to 3.0 grams per kilogram of photographic emulsion or kilogram of gelatin solution. The strength of the emulsion usually ranges from 5–15 percent; the gelatin solution ranges from 2–10 percent. Expressed in terms of solid materials, the amounts of imidazolinium are 1 to 30 grams per kilogram of dry weight of the colloidal carrier material such as gelatin which is used in the preparation of the layer. Expressed in terms of coated area, the effective amounts both for anti-static protection as well as for the "one-pass-wet-on-wet" coating range from 2 to 50 milligrams per square foot.

This technique is of particular value because it permits the preparation of "wet-on-wet" coatings when using emulsions containing color formers which are fast to diffusion. When using the imidazolinium compounds, the unusual difficulties are not encountered and the common defects, including repellency spots, mettle and streakiness which are commonly associated with other surface active agents are noticeably absent. For example, when using saponin or one of the conventional surfactants, it is necessary to apply one coating and dry it before applying the second coating. Otherwise, the above described defects are encountered. However, it is possible to use the "one-pass-wet-on-wet" technique when my imidazolinium compounds are added as the surface active agents to the emulsion containing the color formers. It is thus possible to perform the coating of two layers in a continuous operation without intermediate drying.

Another advantage observed when adding the amphoteric imidazolinium compounds to one or more of the gelatinous layers of a photographic material is the pronounced absence of "air-bells." When using conventional surfactants such as saponium or synthetic compounds of the anionic, cationic or non-ionic type, air bubbles are sometimes formed when the exposed material is placed in the developing solution. In these minute spots, the developer is incapable of penetrating into the emulsion layer. As a result of this deficiency, the finished picture shows pin-hole type defects which are commonly described as "air-bells." These defects are not only unsightly and require retouching of the negative, but are dangerously misleading when they appear on certain types of film, particularly medical or industrial X-ray films and graphic art films. The use of my amphoteric imidazolinium compounds overcomes these disadvantages and prevents the formation of air-bells.

The invention is further illustrated by the following examples. These examples will serve to amplify the specific procedure contemplated, but it is to be understood that the invention is not restricted thereto.

Example I

To one kilogram of a gelatinous silver halide emulsion was added 25 milliliters of a 10 percent aqueous solution of the disodium salt of 2-nonyl-1-($\beta$-carboxyethyl)-1-($\beta$-carboxyethyl)-oxyethylimidazolinium hydroxide prepared according to the procedure described in Example 3A of United States Patent 2,773,068. The emulsion was coated onto a baryta coated paper base to cover an area of 80 square feet. The coating was chilled and allowed to set. An overcoat of an aqueous solution of gelatin containing 2 grams of saponin per liter of 2 percent gelatin solution was applied over the emulsion layer while it was still in a wet condition. The coated material was then chilled and dried. The overcoating effectively adhered to the emulsion coating over which it was applied. The resulting product, exposed through a negative, was developed in a black and white developer having the following formula:

| | Grams |
|---|---|
| Metol | 1.5 |
| Sodium sulfite, anhydrous | 45 |
| Sodium bisulfite | 1 |
| Hydroquinone | 3 |
| Sodium carbonate monohydrated | 6 |
| Potassium bromide | .8 |

Water to make 1 liter.

The developed paper was then fixed, washed and dried.

The processed paper was compared with a conventional material prepared from the same basic emulsion and overcoating but without the use of the imidazolinium compound. In the control coating, the emulsion layer had to be dried before it was possible to apply the surface coating, otherwise coating defects and repellency spots were incurred. By comparison, the material containing the imidazolinium compound in the emulsion which was prepared by the "wet-on-wet" technique was free from any coating defects.

Example II

A photographic film carrying on a cellulose acetate support having an acetyl content of a high speed gelatinous silver bromoiodide emulsion layer was divided into two sections. One section measuring 30 square feet was surface coated with one liter of a 2 percent gelatin solution containing saponin and 0.2 gram of the disodium salt of 2-undecyl-1-carboxymethyl-1-carboxymethyloxyethyl imidazolinium hydroxide and sold by the Miranol Chemical Company of Irvington, New Jersey, under the trade name "Miranol C2M" as described in United States Patent 2,773,068. In the second section, the light sensitive emulsion is overcoated with a surface layer containing only saponin while omitting the imidazolinium compound. Both sections of the film, the one containing saponin plus the imidazolinium compound and the other which contained saponin only were conditioned at relative humidities of 25 and 40 percent. The samples were then subjected to the action of a static generating apparatus as described by R. D. Fines in his paper "Anti-Static Specialty Products Open New Markets," presented at the Chemical Specialties Manufacturers Association meeting on May 17, 1955. Essentially, the test involved rubbing both films in total darkness with a Nylon® pad so as to generate static electricity in the film. Both test sections were then processed together in the usual manner which included black and white development, fixing, washing and drying. Both sections were then examined for static discharge marks which can be readily recognized by the black streaks, specks, lines or various other patterns in the otherwise clear emulsion. The control film containing only saponin was completely covered with static discharge marks and was considered to be unusable. The section which had been overcoated with the layer containing the imidazolinium compound had practically no static discharge marks and was entirely free of such defects although the control had objectionable static discharge recording.

When samples of the two films were exposed in a camera to an original scene, developed in a black and white developer, short stopped, fixed and dried, it was found that the control film showed pronounced pin-hole and air-bell defects. The film, which was provided with the surface coating which contained the imidazolinium compound, did not show these defects.

*Example III*

Example II was repeated with the exception that the monosodium salt of 2-heptadecyl-1-carboxymethyl-1-hydroxyethyl imidazolinium hydroxide was used as the antistatic agent. In the static generating test which, as in Example II, was carried out in total darkness, none of the ten samples which contained the imidazolinium compound in the surface layer showed any static marks. Of the ten controls which contained only saponin in the surface layer, three samples showed static marks which could be classified as medium while the other 7 had very heavy static marks.

*Example IV*

Example II was repeated with the exception that the disodium salt of 2-heptadecenyl-1-carboxymethyl-1-hydroxyethyl imidazolinium hydroxide was used as the antistatic agent. In static generating tests which were carried out by running the film through a motion picture camera in total darkness, none of the ten samples tested, which contained the imidazolinium compound in the surface layer, showed any static marks. All of the ten control samples, which contained only saponin in the surface layer, showed pronounced static marks. One could be classified as medium, while the other had very heavy static marks.

*Example V*

To one kilogram of a silver halide emulsion of high contrast and suitable for half-tone reproduction was added 20 milliliters of a 10 percent aqueous solution of the disodium salt of 2-nonyl-1-($\beta$-carboxyethyl)-1-($\beta$-carboxyethyl)oxyethyl imidazolinium hydroxide. The emulsion was coated onto a subbed cellulose acetate film base to cover an area of 70 square feet. The emulsion was dried, exposed to an original and developed for 2 minutes in a high contrast graphic arts developer, fixed, washed and dried. This film was entirely free of air-bells whereas a control film prepared without the addition of the imidazolinium compound showed a large number of air-bell defects.

*Example VI*

To one kilogram of a liquid photographic silver halide emulsion containing 80 grams of gelatin and 40 grams of silver bromoiodide was added a color former dispersion prepared from 1 gram of 5-(N-benzyl-N-naphthalenesulfonamino)-1-naphthol, 3 grams of ethylacetate, 3 grams of N,N-di-n-butylcarbonate, 0.4 gram of tri-isopropyl-naphthalene sulfonate, 0.04 gram of glyceryl monostearate in 50 milliliters of water prepared in accordance with the method described in Example II of United States Patent 2,322,027. The emulsion was coated on a subbed cellulose ester film support to cover an area of 80 square feet. It required setting and drying before it could be overcoated with a clear gelatin layer. This intermediate drying could be omitted when the surfactants tri-isopropylphthalene sulfonate and the glyceryl monostearate were replaced by 2.5 grams of the disodium salt of 2-undecyl-1-($\beta$-carboxyethyl)-1-($\beta$-carboxymethyl)-oxyethylimidazolinium hydroxide.

The same benefits of better dispersion and omission of the intermediate drying step can be obtained with other non-diffusing color formers which are continuously added to the silver halide emulsion, dispersed in a mixture of high boiling and low boiling solvents to form packet-type emulsions with capsulated color formers. Such color formers are known to persons skilled in the art. Typical representatives are described in United States Patents 2,186,852; 2,179,239; 2,179,244; 2,298,443; 2,369,489 and 2,511,231.

The identical benefits of the "one-pass-wet-on-wet" coatings are also obtained with silver halide emulsions which contain color formers which are provided with a solubilizing sulfo or carboxy group, and therefore, soluble in alkali solutions, for instance, sodium hydroxide solutions. Such color formers, which form upon color development with a primary amino developer azomethine quinonimine or azine dyes, are described in United States Patents 2,186,734; 2,445,252; 2,530,349; 2,671,021; 2,524,725; 2,354,552 and 2,547,037.

Modifications of the invention will occur to persons skilled in the art. For instance, in place of gelatin, there may be used other water-permeable synthetic colloids such as water soluble cellulose esters of lactic or glycolic acid, partially hydrolyzed polyvinyl acetate, modified polyvinyl alcohol and water soluble polyvinyl acetals and the like. In place of saponin, other suitable synthetic surface active agents may be added, such as sulfated oleic acid, alkylated monosodium benzenesulfonate, dihexyl ester of sodium sulfosuccinate, sodium salt of an alkylnaphthalene sulfonic acid, sodium salt of tetrahydronaphthalene sulfonic acid, calcium glycerin phosphate, alkylphenylpolyethylene glycol, oleic acid ester of hydroxyethane sulfonic acid, and sulfonates of high molecular weight primary or secondary aliphatic, aromatic and cycloaliphatic carboxy acids.

I, therefore, do not intend to be limited in the patent granted except as necessitated by the appended claims.

I claim:

1. A photographic element comprising a support carrying a photographic silver halide emulsion layer and an anti-static layer of a water permeable colloid, said layer containing an anti-static amount of an imidazolinium compound selected from the group consisting of those compounds having the following general formulae:

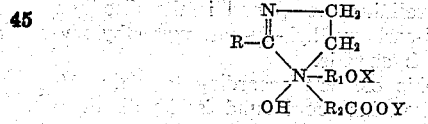

and

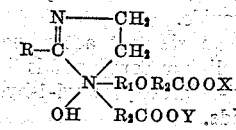

wherein R is a member of the group consisting of an aliphatic hydrocarbon chain having from 7 to 21 carbon atoms; $R_1$ and $R_2$ are aliphatic hydrocarbon radicals of from 1 to 4 carbon atoms; X is a member of the group consisting of hydrogen and alkali metal atoms, and Y is an alkali metal atom.

2. A photographic element according to claim 1 wherein said imidazolinium compound is the disodium salt of 2-nonyl -1 - ($\beta$ - carboxyethyl) - 1 - ($\beta$ - carboxyethyl)oxyethylimidazolinium hydroxide.

3. A photographic element according to claim 1 wherein said imidazolinium compound is the disodium salt of 2-undecyl - 1 - carboxymethyl - 1 - carboxymethyloxyethyl imidazolinium hydroxide.

4. A photographic element according to claim 1 wherein said imidazolinium compound is the disodium salt of 2-hepta-decenyl-1-carboxymethyl - 1 - hydroxethyl imidazolinium hydroxide.

5. A photographic element according to claim 1 wherein said imidazolinium compound is the monosodium salt of 2-hepta-decyl-1-carboxymethyl-1-hydroxethyl imidazolinium hydroxide.

6. A photographic element according to claim 1 wherein said anti-static amount is on the order of from 2–200 milligrams per kilogram of dry colloidal carrier material.

7. A photographic material according to claim 1 wherein said anti-static amount is on the order of from 25–150 milligrams per square foot of coated area.

8. A photographic material as defined in claim 1 wherein said layer contains a small amount of saponin.

9. A photographic material comprising a support carrying a silver halide emulsion layer containing an imidazolinium compound selected from the group consisting of the compounds having the following general formulae:

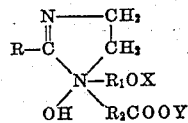

and

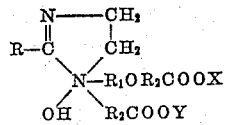

wherein R is a member of the group consisting of an aliphatic hydrocarbon chain having from 7 to 21 carbon atoms; $R_1$ and $R_2$ are aliphatic hydrocarbon radicals of from 1 to 4 carbon atoms; X is a member of the group consisting of hydrogen and alkali metal atoms, and Y is an alkali metal atom.

10. A photographic material as defined in claim 9 wherein said imidazolinium compound is present in an amount corresponding to from 0.1 to 3.0 grams per kilogram of colloidal carrier material used in the preparation of the emulsion.

11. A photographic element according to claim 10 wherein the said imidazolinium compound is the disodium salt of 2-nonyl-1-($\beta$-carboxyethyl) - 1 - ($\beta$ - carboxyethyl-oxethyl imidazolinium hydroxide.

12. A photographic element according to claim 10 wherein said imidazolinium compound is the disodium salt of 2-undecyl-1-carboxyethyl - 1 - carboxymethyloxy-ethyl imidazolinium hydroxide.

13. A photographic element according to claim 10 wherein said imidazolinium compound is the disodium salt of 2-heptadecenyl-1-carboxymethyl - 1 - hydroxyethyl imidazolinium hydroxide.

14. A photographic element according to claim 10 wherein said imidazolinium compound is the monosodium salt of 2-heptadecyl-1-carboxymethyl-1-hydroxyethyl imidazolinium hydroxide.

15. A photographic material as defined in claim 10 wherein said emulsion layer contains a color former fast to diffusion capable upon development with a primary amino developing agent to form an image selected from the group consisting of azomethine, quinoneimine and phenazonium dyes.

16. A photographic material comprising a support, a silver halide emulsion layer and on an outer surface of that film an anti-static layer comprising a water-permeable colloid and an anti-static amount of an amphoteric imidazolinium compound selected from the group consisting of those having the following general formulae:

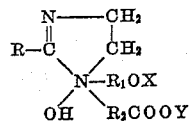

and

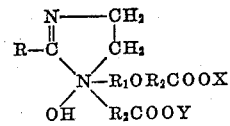

wherein R is a member of the group consisting of an aliphatic hydrocarbon chain having from 7 to 21 carbon atoms; $R_1$ and $R_2$ are aliphatic hydrocarbon radicals of from 1 to 4 carbon atoms; X is a member of the group consisting of hydrogen and alkali metal atoms, and Y is an alkali metal atom.

17. A photographic element according to claim 16 wherein said imidazolinium compound is the disodium salt of 2-nonyl-1-($\beta$-carboxyethyl) - 1 - ($\beta$ - carboxyethyl) oxyethyl imidazolinium hydroxide.

18. A photographic element according to claim 16 wherein said imidazolinium compound is the disodium salt of 2-undecycl-1-carboxymethyl - 1 - carboxymethyl-thyl imidazolinium hydroxide.

19. A photographic element according to claim 16 wherein said imidazolinium compound is the disodium salt of 2-heptadecenyl-1-carboxyethyl - 1 - hydroxyethyl imidazolinium hydroxide.

20. A photographic element according to claim 16 wherein said imidazolinium compound is the monosodium salt of 2-heptadecyl-1-carboxymethyl-1-hydroxyethyl imidazolinium hydroxide.

References Cited in the file of this patent

UNITED STATES PATENTS 2,773,068  Mannheimer _____ Dec. 4, 1956

OTHER REFERENCES

Schwartz et al.: Surface Active Agents and Detergents, vol. II, Interscience, 1958, pages 732 and 733.

UNITED STATES PATENT OFFICE
CERTIFICATE OF CORRECTION

Patent No. 2,982,651

May 2, 1961

E Scudder Mackey

It is hereby certified that error appears in the above numbered patent requiring correction and that the said Letters Patent should read as corrected below.

Column 7, line 42, for "-(β-carboxyethyl-" read -- -(β-carboxyethyl)- --; column 8, line 37, for "2-undecycl-" read -- 2-undecyl- --; line 42, for "-1-carboxyethyl-" read -- -1-carboxymethyl- --.

Signed and sealed this 17th day of April 1962.

(SEAL)
Attest:

ESTON G. JOHNSON
Attesting Officer

DAVID L. LADD
Commissioner of Patents